J. M. REED.
AUTOMATIC TRACK GAGE.
APPLICATION FILED JUNE 11, 1913.
1,149,540.
Patented Aug. 10, 1915.
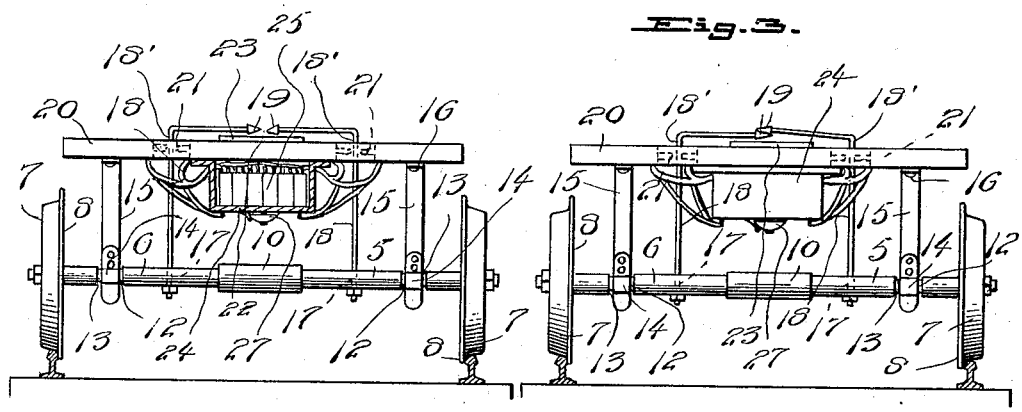
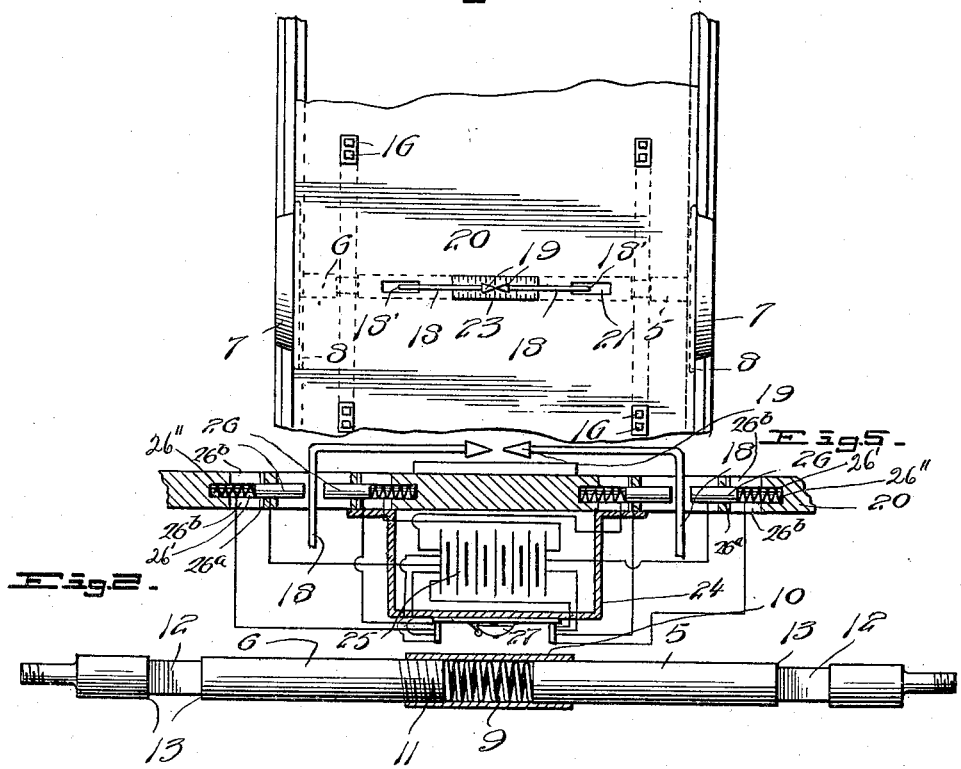
Witnesses
Chas. E. Kumpus
S. P. Buck.
Inventor
J. M. Reed.
By Chandler Chandler
Attorneys
COLUMBIA PLANOGRAPH CO., WASHINGTON, D. C.

UNITED STATES PATENT OFFICE.

JOHN M. REED, OF OILCENTER, CALIFORNIA.

AUTOMATIC TRACK-GAGE.

1,149,540. Specification of Letters Patent. Patented Aug. 10, 1915.

Application filed June 11, 1913. Serial No. 773,096.

*To all whom it may concern:*

Be it known that I, JOHN M. REED, a citizen of the United States, residing at Oilcenter, in the county of Kern, State of California, have invented certain new and useful Improvements in Automatic Track-Gages; and I do hereby declare the following to be a full, clear, and exact description of the invention, such as will enable others skilled in the art to which it appertains to make and use the same.

This invention relates to track gages, and it more particularly relates to an improved form of traveling track gage for registering unevennesses in railroad track.

An object of the invention is to provide an improved and simplified form of track gage which may be attached to any railroad car or truck, and which registers the track variations on a scaled plate attached to one gage finger or index element.

Another object of the invention is to provide a track gage of this character which is light, comparatively inexpensive and thoroughly efficient.

Other objects and advantages will be recited hereinafter and in the claims.

In the accompanying drawings, which supplement this specification, Figure 1 is a rear elevation view of a railway truck having my improved gage attached thereto, the index fingers or pointers being slightly separated. Fig. 2 is an enlarged detail of the axle, the sleeve being in section. Fig. 3 is a view of my improved track gage, the pointed ends of the index fingers being in lapped relation, and Fig. 4 is a plan view of a section of the truck platform, illustrating my improved track gage partly in full lines and partly in broken lines, and, Fig. 5 is a diagrammatic view illustrating the electric connections whereby the several circuits are closed.

Referring to these drawings, in which similar reference characters correspond with similar parts, throughout the several views, the device is illustrated in connection with a truck of ordinary construction, for the purpose of showing the application of the invention. The gage consists of a pair of axially alined axles 5 and 6, each carrying a track wheel 7 having flanges 8. These axles have their inner ends spaced apart sufficiently to receive a spring 9 which normally holds the flanges 8 against the contiguous track rails. A sleeve 10 incloses the spring 9, and is in screw threaded engagement with the axle 6, as indicated at 11. The axle 5 is snugly but movably fitted in the sleeve 10, so that the expansion of the spring 9, which bears against the ends of the axles 5 and 6, normally holds the axles separated to the full limit allowed by the track rails and the flanges 8.

The shafts or axles 5 and 6 together with the sleeve 10 constitute an extensible axle, and each of these sections 5 and 6 is provided with a reduced portion 12 having resultant shoulders 13, and the reduced portions are slidably mounted in bearings 14, while the shoulders 13 constitute abutments for limiting the sliding movement of the shaft sections through said bearings. The extensible axle does not rotate in the bearings 14 but the wheels 7 rotate on the ends of said axle.

The bearings 14 are connected with the truck by means of hangers 15, each of these hangers being connected with the truck floor by means of bolts 16.

Each of the axle sections is provided with a vertical aperture 17 in which is secured a standard or gage finger 18, each gage finger having its upper portion extended horizontally and terminating in an arrow head or pointed index element 19. The truck floor 20 is apertured or slotted at 21, and through these apertures extend the respective gage fingers 18 which have their upper portions alined with each other and have their heads 19 in proximity with each other and are normally spaced apart at 22. A scaled plate or bar 23 is secured to the truck floor 20 and is normally centered under the gap 22 between the elements 19, so that when the middle line of the scale 23 is in registry with either of the elements 19 it indicates that that side of the track is properly positioned on the railroad bed. In other words, when the right hand railway rail is in its normal and proper position, the flange 8 coacts with said rail for holding the element 19 in its normal position; but if the rail is bent outward at any point, the arrow head or indicator element 19 will be spaced apart from the middle line of the scale. On the other hand, if the right hand track is bent inward at any point, the flange 8 of the right hand wheel will be forced inward, so as to press the shaft element 5 against the action of the spring 9 and cause said shaft section to slide through the hanger 14 and to move the indicator finger toward the left, so that it will overlap the middle line of the scale. Now, it will be seen that in case both track rails should be inwardly curved at opposite points, the arrow heads 19 would overlap each other; and this overlapping of the indicator elements 19 would also occur in case either of the wheels 7 should strike an obstacle with sufficient force to press the indicator element inward a sufficient distance. These indicator fingers are preferably of steel or other springy material, so that they will readily yield when overlapping each other and will return to the plane in which they normally lie.

Secured under the platform 20 is a receptacle 24 containing several electric dry cells 25 connected by means of wires to opposed push buttons 26 which are yieldably held in horizontal orifices 26' formed in the side walls of vertical slots or apertures 21 of the platform 20 by coil springs 26'' disposed in said horizontal orifices. In case of excessive widening or narrowing of the railway rails the gage fingers 18 come in contact with the push buttons 26 with a resultant ringing of the gong 27. The push buttons 26 are prevented from moving entirely out of the orifices 26' by pins 26$^a$ disposed in slots 26$^b$.

It will be seen that the scale 23 and indicator elements 19 are in plain and unobstructed view, where the operator may easily observe every movement of said indicator fingers and their relation to the scale; and this may be done while the operator of the truck is engaged in propelling the latter. Moreover, the scale is in such position as to receive the greatest amount of light, for rendering the scale lines visible and distinct. It will be seen that in case the operator's attention be momentarily taken from the indicator fingers and the gage should travel over a portion of the track where the railroad rails were not properly positioned on the railroad bed, the action of the gage finger against the push buttons, automatically ringing the gong or alarm 27, will warn the operator of such track deficiency.

It will be seen that I have provided a device of this character which is fully capable of attaining the desired objects, in a thoroughly practical and efficient manner.

I do not limit my invention to the exact details of construction, combination and arrangement of parts, as herewith illustrated and described, but my invention may only be limited by a reasonable interpretation of the claims.

I claim:

1. In combination with a truck having an apertured floor a scale between the apertures, an extensible axle under the truck floor consisting of relatively movable sections, hangers secured to the truck floor and provided with bearings in which the axle sections are respectively non-rotatably mounted and adapted to be moved axially, flanged track wheels on the axle sections respectively, and indicator fingers extending upward through the apertured truck floor and thence connected to the axle sections respectively and extending horizontally over said scale.

2. In combination with an apertured floor, a horizontal scale mounted on said floor and normally held midway between the apertures of the floor, a pair of non-rotatable and axially movable axle sections each having a track wheel thereon, hangers connecting said axle sections to the floor, a sleeve having one end engaged with one of the axle sections and having an end of the other axle section snugly and movably seated therein, a spring within the sleeve and bearing against the adjacent ends of the axle sections, and index fingers connected to the axle sections respectively and extending upward through the apertures of the floor and thence extending laterally over the horizontal scale.

3. A track gage consisting of a pair of shaft sections, each carrying a track wheel and the sections being in axial alinement with and adapted for axial movement relative to each other, an index finger extending upward from each shaft section and then parallel to each section and each terminating in a pointed index element, and a scale having its middle line normally in a vertical plane coinciding with the apexes of the converging index elements, said index fingers being of springy material, so that said converging index elements may slide upon each other into overlapped relation.

In testimony whereof, I affix my signature, in the presence of two witnesses.

JOHN M. REED.

Witnesses:
W. S. REED,
W. R. HIRES.

Copies of this patent may be obtained for five cents each, by addressing the "Commissioner of Patents, Washington, D. C."